United States Patent
Wallentin et al.

(10) Patent No.: US 10,314,006 B2
(45) Date of Patent: Jun. 4, 2019

(54) APPARATUS AND METHODS FOR PAGING

(71) Applicant: Telefonaktiebolaget L M Ericsson (publ), Stockholm (SE)

(72) Inventors: Pontus Wallentin, Linköping (SE); Icaro L. J. da Silva, Bromma (SE); Pål Frenger, Linköping (SE); Gunnar Mildh, Sollentuna (SE); Johan Rune, Lidingö (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/650,040

(22) PCT Filed: Mar. 18, 2015

(86) PCT No.: PCT/SE2015/050317
§ 371 (c)(1),
(2) Date: Jun. 5, 2015

(87) PCT Pub. No.: WO2016/148617
PCT Pub. Date: Sep. 22, 2016

(65) Prior Publication Data
US 2017/0041900 A1    Feb. 9, 2017

(51) Int. Cl.
*H04W 68/00*    (2009.01)
*H04W 68/02*    (2009.01)
(Continued)

(52) U.S. Cl.
CPC ........... *H04W 68/02* (2013.01); *H04W 68/12* (2013.01); *H04W 88/06* (2013.01); *H04W 88/16* (2013.01)

(58) Field of Classification Search
CPC .................................................... H04W 68/02
(Continued)

(56) References Cited

U.S. PATENT DOCUMENTS 6,005,852 A    12/1999    Kokko et al.
6,236,860 B1    5/2001    Hagting et al.
(Continued)

FOREIGN PATENT DOCUMENTS

EP    2755429 A1    7/2014
EP    2833669 A1    2/2015
(Continued)

OTHER PUBLICATIONS

Da Silva, Icaro et al., "Tight integration of new 5G air interface and LTE to fulfill 5G requirements", IEEE, ISBN 978-1-4799-8088, 2015, 1-5.
(Continued)

*Primary Examiner* — Charles T Shedrick
(74) *Attorney, Agent, or Firm* — Murphy, Bilak & Homiller, PLLC

(57) ABSTRACT

The disclosure relates to a method for responding to a paging message in a wireless device of a wireless communication network. The method comprises receiving (910) a paging message from the wireless communication network on a first access. The method also comprises receiving (920) configuration information from the wireless communication network indicating how to respond to the received paging message. The configuration information comprises information indicating that the received paging message should be responded to on another access than the first access. An access comprises at least one of a radio access technology, a cell, and a frequency band. The method further comprises responding (930) to the paging message as indicated by the received configuration information. The disclosure also relates to a corresponding method performed in the network, and to the corresponding apparatus.

22 Claims, 13 Drawing Sheets

(51) Int. Cl.
*H04W 68/12* (2009.01)
*H04W 88/06* (2009.01)
*H04W 88/16* (2009.01)

(58) Field of Classification Search
USPC .......................................................... 455/458
See application file for complete search history.

(56) References Cited

U.S. PATENT DOCUMENTS

| | | | |
|---|---|---|---|
| 7,016,321 B1 | 3/2006 | Park et al. | |
| 7,308,023 B1 | 12/2007 | Blair et al. | |
| 8,634,353 B2 | 1/2014 | Teague et al. | |
| 9,088,509 B1 | 7/2015 | Sella et al. | |
| 2002/0105906 A1 | 8/2002 | Marjelund et al. | |
| 2003/0103520 A1 | 6/2003 | Chen et al. | |
| 2005/0147030 A1 | 7/2005 | Lenzini et al. | |
| 2007/0211660 A1 | 9/2007 | Teague et al. | |
| 2007/0258405 A1 | 11/2007 | Kim et al. | |
| 2008/0037470 A1 | 2/2008 | Kim et al. | |
| 2008/0133995 A1 | 6/2008 | Lohr et al. | |
| 2011/0119548 A1 | 5/2011 | Imamura et al. | |
| 2012/0269137 A1 | 10/2012 | Kang et al. | |
| 2013/0262915 A1 | 10/2013 | Frank et al. | |
| 2013/0303203 A1* | 11/2013 | Wang | H04W 68/00 455/458 |
| 2014/0153390 A1 | 6/2014 | Ishii et al. | |
| 2014/0220974 A1 | 8/2014 | Hsu | |
| 2015/0016381 A1* | 1/2015 | Kaikkonen | H04W 48/18 370/329 |
| 2015/0016390 A1 | 1/2015 | McBeath et al. | |
| 2015/0023269 A1 | 1/2015 | Lee et al. | |
| 2015/0043479 A1 | 2/2015 | Kitazoe et al. | |
| 2015/0063166 A1 | 3/2015 | Sif et al. | |
| 2015/0296481 A1* | 10/2015 | Yu | H04W 68/02 370/336 |
| 2015/0355919 A1 | 12/2015 | Gatherer et al. | |
| 2015/0373559 A1 | 12/2015 | Hong | |
| 2016/0007237 A1 | 1/2016 | Yi et al. | |
| 2016/0036541 A1 | 2/2016 | Lindoff et al. | |
| 2016/0112149 A1 | 4/2016 | Kim et al. | |
| 2016/0227514 A1* | 8/2016 | Burbidge | H04W 68/08 |
| 2016/0330680 A1 | 11/2016 | Yi et al. | |
| 2017/0055202 A1 | 2/2017 | Uchiyama et al. | |
| 2017/0070312 A1 | 3/2017 | Yi et al. | |

FOREIGN PATENT DOCUMENTS

| | | |
|---|---|---|
| JP | 2017534222 A | 11/2017 |
| WO | 2009158626 A1 | 12/2009 |
| WO | 2012140470 A1 | 10/2012 |
| WO | 2014021761 A2 | 2/2014 |
| WO | 2014166050 A1 | 10/2014 |
| WO | 2016074702 A1 | 5/2016 |
| WO | 2016099369 A1 | 6/2016 |
| WO | 2016130061 A1 | 8/2016 |

OTHER PUBLICATIONS

Frenger, Pål et al., "A Clean Slate Radio Network Designed for Maximum Energy Performance", IEEE PIMRC, 2014, 1-5.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

Unknown Author, "Relaxed Measurements for Inter-frequency Cell Search", 3GPP TSG-RAN WG4 Meeting #70 R4-140761, Prague, Czech Republic, Feb. 10-14, 2014, 1-5.

Unknown, Author, "ETSI GS NFV 002 V1.1.1", Network Functions Virtualisation (NFV); Architectural Framework, Oct. 2013, pp. 1-21.

* cited by examiner

APPARATUS AND METHODS FOR PAGING

TECHNICAL FIELD

The disclosure generally relates to paging, and particularly relates to methods and apparatus for supporting paging and for responding to a paging message in a wireless communication network.

BACKGROUND

Evolved Packet System (EPS) is the evolved $3^{rd}$ Generation Partnership Project (3GPP) Packet Switched Domain. EPS includes Evolved Packet Core (EPC), and Evolved Universal Terrestrial Radio Access Network (E-UTRAN) or Long Term Evolution (LTE), and is sometimes also referred to as a fourth generation (4G) system. An EPC architecture comprises a Packet Data Network (PDN) Gateway (PGW), a Serving Gateway (SGW), a Policy and Charging Rules Function (PCRF), and a Mobility Management Entity (MME). The radio access, E-UTRAN, consists of one or more eNodeBs (eNB), serving wireless devices also called User Equipment (UE).

FIG. 1 shows the overall E-UTRAN architecture and includes eNBs, providing the E-UTRA user plane and control plane protocol terminations towards the UE. The user plane control terminations comprise Packet Data Convergence Protocol (PDCP), Radio Link Control (RLC), Medium Access Control (MAC), and a Physical Layer (PHY). The control plane control terminations comprise Radio Resource Control (RRC) in addition to the listed user plane control terminations. The eNBs are interconnected with each other by means of an X2 interface. The eNBs are also connected by means of the S1 interface to the EPC, more specifically to the MME by means of the S1-MME interface and to the SGW by means of the S1-U interface. The main parts of the EPC Control Plane and User Plane architectures are shown in FIG. 2 and FIG. 3 respectively.

Integration of new radio technologies to legacy ones has always been an important feature in any wireless communication generation shift. A future fifth generation (5G) Radio Access Technology (RAT) is preferably tightly integrated with another RAT, such as the EPS/4G RAT. The envisioned tighter integration may lead to architecture problems that have to be solved. In this context, the tight integration means that common protocol layer(s) running on the top of RAT-specific protocol layers of LTE and of the new 5G air interface will be specified.

System Control Plane Concept

For the purpose of 5G, a clean slate radio network solution that has been designed as described in the article "A Clean Slate Radio Network Designed for Maximum Energy Performance" published at IEEE PIMRC 2014, with the aim to maximize energy performance, simplify usage of advanced antenna systems, and reduce interference. A logical separation between idle mode functions and user plane data transmission and reception is proposed. This separation allows meeting the key challenge of reducing idle mode energy consumption in the network by designing for Discontinuous transmission and reception (DTX and DRX) also in the network nodes. The clean slate energy optimized system design targets this challenge with a new way of transmitting system information and performing initial system access. A 5G System Control Plane (SCP) is designed to be ultra-lean and static. When there are no data transmissions there should be as little mandatory network transmissions as possible. Furthermore all nodes do not need to participate in the distribution of system information.

An SCP should have a very limited number of responsibilities. Among the few functions that are supported by the SCP are Random Access (RA), including distribution of access information, and paging, including passive mode mobility and location area update. The information related to initial system access is broadcasted in an access information table (AIT). A particular AIT may contain information relating to several different nodes in the network. A system signature sequence associated with a system signature index (SSI) is transmitted from a network node and the received SSI can then be used by a wireless device to select the relevant access information from the AIT. Everything else is defined on a per need basis, such as the format used for transmission of user plane data, and can therefore be optimized for the active users without any concern on how that affect idle mode users. RA and paging are perhaps the most basic functions in a mobile broadband network. In order to perform a RA the UEs need to receive some information on how to do that. That information is denoted access information. In order to support paging functions like location area update and idle mode mobility, additional UE paging configuration (UEPC) is needed. The UEPC is sent in a dedicated fashion only to UEs that should be possible to page from the network. The UEPC typically contain information on:

The configuration of the downlink paging channel;
How to determine the current tracking area code (TAC) identity;
When and how to perform a location area update.

Problems with Existing Solutions

Today the UE needs to ensure that it camps on the "best" cell and RAT in order to be best served when it uses the network services. The "best" cell or RAT is determined using a number of specified criteria. This is important to avoid a cell reselection or handover immediately after the UE has set up a connection and has requested the particular service. For example, a UE which prefers the 5G RAT since it wants to use 5G services, needs to camp on cells for the 5G RAT whenever these cells are available. However, newer RATs typically have spotty coverage, and this will probably be the case for the 5G RAT when it is newly deployed. Therefore, enforcing the UE to camp on the 5G RAT when possible may imply that frequent measurements and cell reselection evaluations are needed, thus leading to UE power drain. Furthermore, it may imply that a large number of location area update signaling messages are needed as the UE move in and out of the 5G RAT coverage, thus leading to high signaling load on the network.

In order to reduce UE complexity, save UE power and reduce signaling, it is therefore beneficial if the UE camps in a single RAT such as in LTE which has a better coverage than the 5G RAT. This is the case already in existing multi-RAT scenarios, and will be useful also in the case of the 4G-5G tight integration. If the UE camps on a given RAT and receives a paging message in this RAT, the UE will currently respond in this RAT and in the same cell where it received the page.

However, this means that the UE will not always initiate a connection in the optimal RAT, which in turn increases overhead and to some extent user session establishment delay if a handover immediately after connection establishment is needed. Furthermore, in the SCP design the UE does not camp on any cell, as the cell concept is not the same as in a conventional network design. If there are no cells then connecting a UE to the node that transmitted a paging message is not trivial. The UE may e.g. instead access a small cell that is controlled by a node which does not have any data buffered to the UE because the data may instead be located in a node controlling a macro cell.

SUMMARY

An object may be to alleviate or at least reduce one or more of the above mentioned problems. This object and others are achieved by the methods, the wireless device, and the network arrangement according to the independent claims, and by the embodiments according to the dependent claims.

According to a first aspect, a method for responding to a paging message is provided. The method is performed by a wireless device in a wireless communication network. The method comprises receiving a paging message from the wireless communication network on a first access. The method also comprises receiving configuration information from the wireless communication network indicating how to respond to the received paging message. The configuration information comprises information indicating that the received paging message should be responded to on another access than the first access. An access comprises at least one of a radio access technology, a cell, and a frequency band. The method further comprises responding to the paging message as indicated by the received configuration information.

According to a second aspect, a method for supporting paging of a wireless device is provided. The method is performed by a network arrangement comprising one or more network nodes in a wireless communication network. The method comprises providing configuration information to the wireless device indicating how the wireless device should respond to a received paging message. The configuration information indicates that the received paging message should be responded to on another access than a first access on which the paging message is received. An access comprises at least one of a radio access technology, a cell, and a frequency band.

According to a third aspect, a wireless device for a wireless communication network configured to respond to a paging message is provided. The wireless device is further configured to receive a paging message from the wireless communication network on a first access, and receive configuration information from the wireless communication network indicating how to respond to the received paging message. The configuration information comprises information indicating that the received paging message should be responded to on another access than the first access. An access comprises at least one of a radio access technology, a cell, and a frequency band. The wireless device is also configured to respond to the paging message as indicated by the received configuration information.

According to a fourth aspect, a network arrangement for a wireless communication network is provided. The network arrangement comprises one or more network nodes and is configured to support paging of a wireless device. The network arrangement is further configured to provide configuration information to the wireless device indicating how the wireless device should respond to a received paging message. The configuration information indicates that the received paging message should be responded to on another access than a first access on which the paging message is received. An access comprises at least one of a radio access technology, a cell, and a frequency band.

According to further aspects, the object is achieved by computer programs and computer program products corresponding to the aspects above.

One advantage of embodiments is that the wireless device is enabled to receive a paging message in one access and respond to the paging message in another access. The wireless device can thereby use a given preferred access without having to camp on that access in idle mode, or without having to perform a change to another access after connection setup. This will reduce overhead and user session establishment delay.

Other objects, advantages and features of embodiments will be explained in the following detailed description when considered in conjunction with the accompanying drawings and claims.

BRIEF DESCRIPTION OF THE DRAWINGS

The various aspects of embodiments disclosed herein, including particular features and advantages thereof, will be readily understood from the following detailed description and the accompanying drawings.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
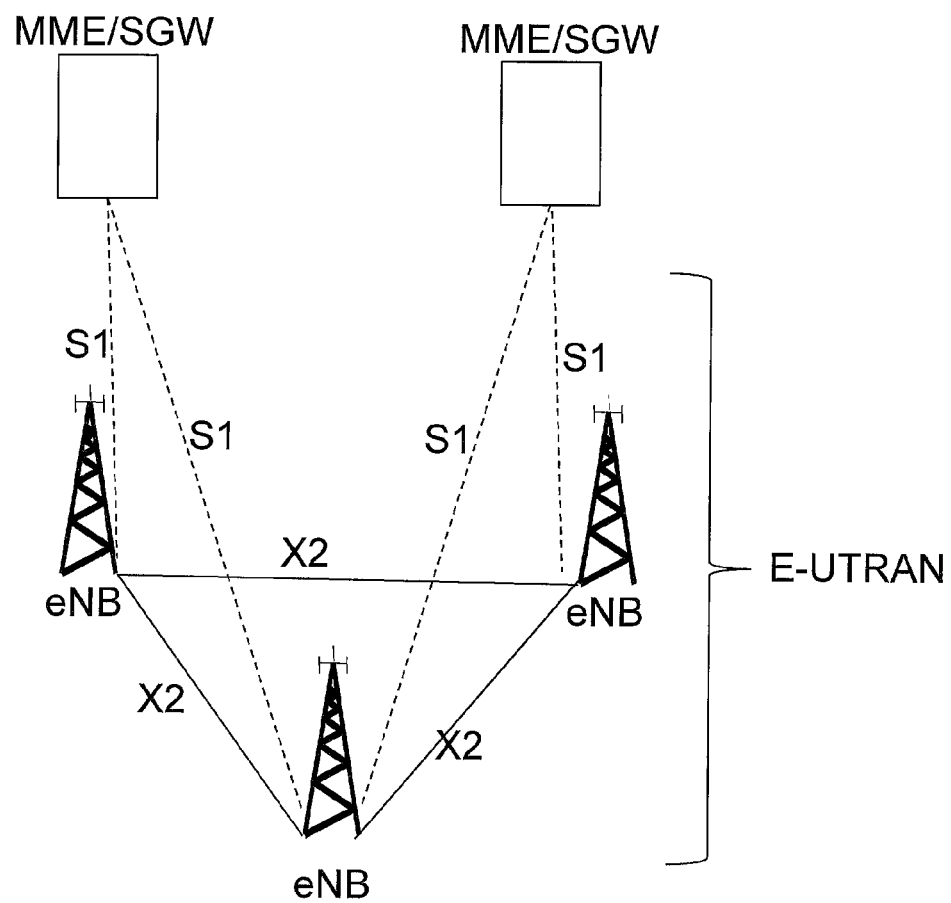
FIG. 1 is a block diagram schematically illustrating an E-UTRAN overall architecture.
Figure 2:
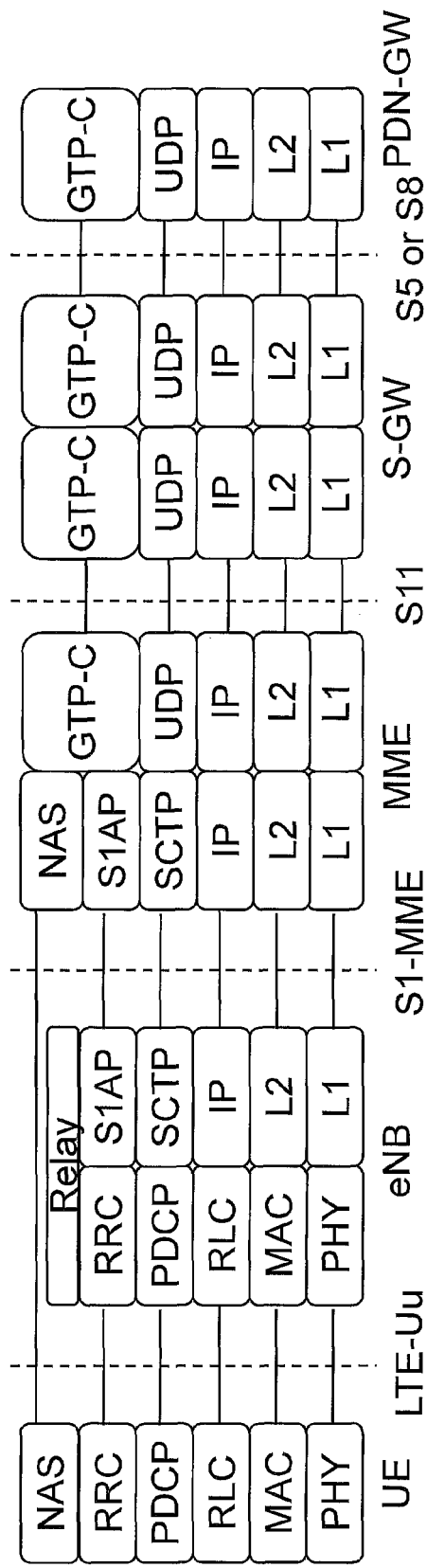
FIG. 2 schematically illustrates an EPC Control Plane protocol architecture.
Figure 3:
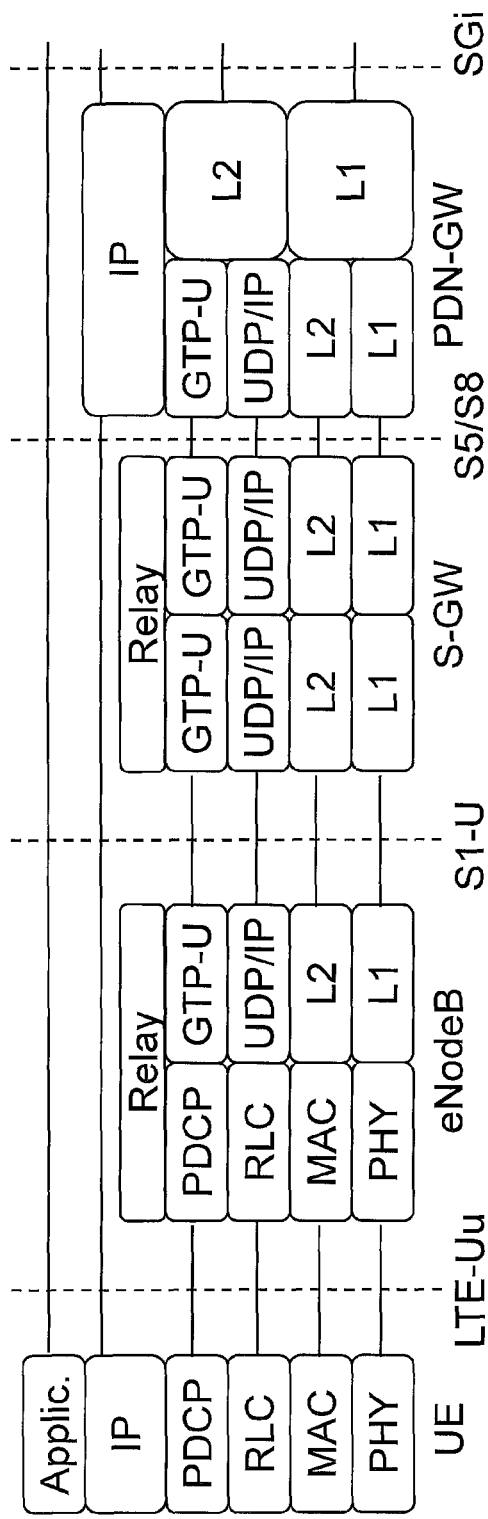
FIG. 3 schematically illustrates an EPC User Plane protocol architecture.
Figure 4:
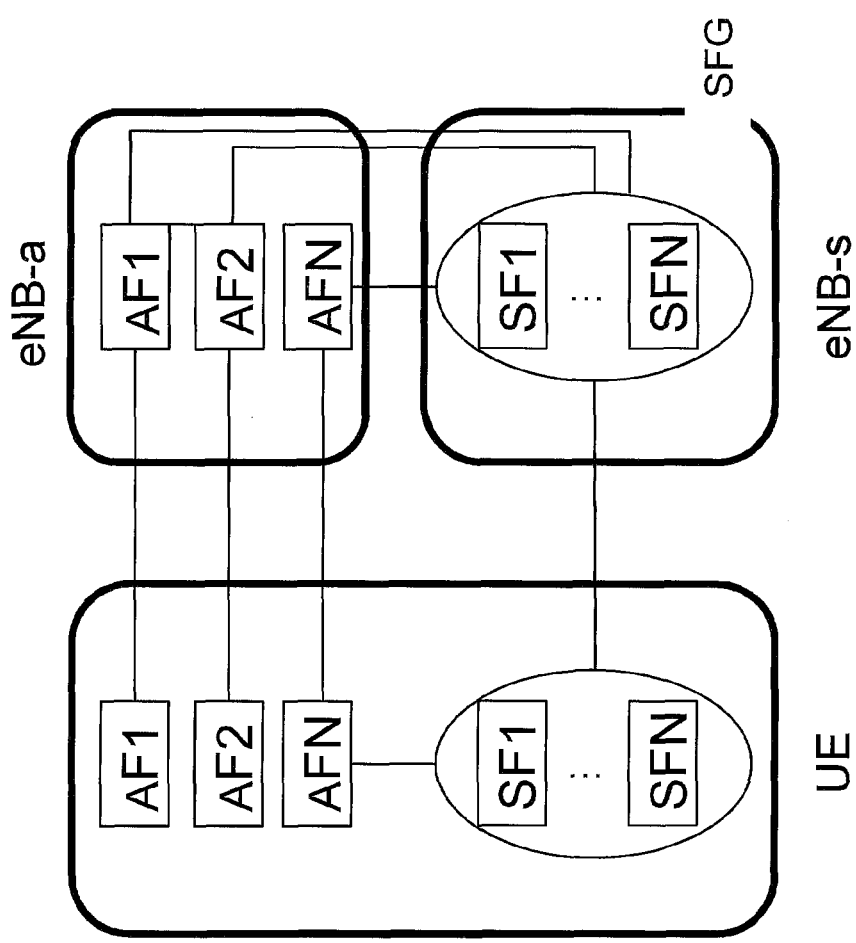
FIG. 4 schematically illustrates a functional split of RAN functions into asynchronous and synchronous functions.
Figure 5A:
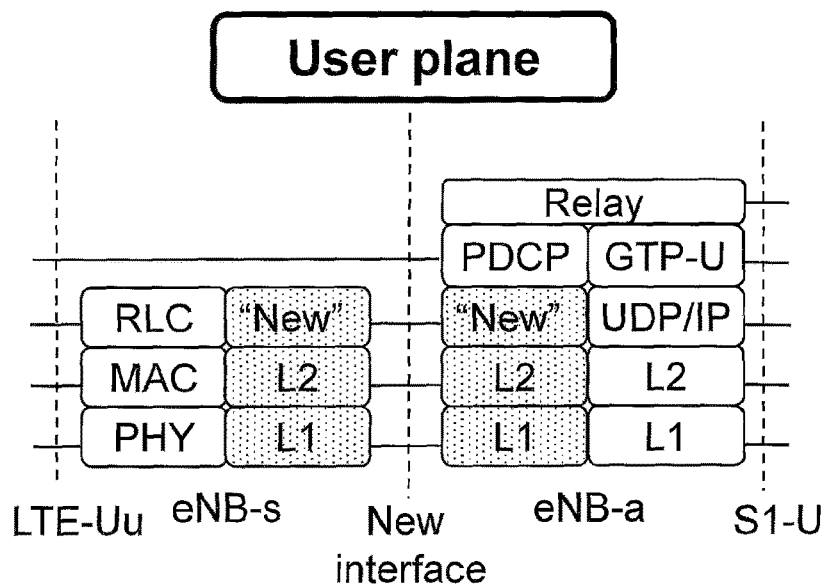
FIGS. 5a and 5b schematically illustrate an eNB split into eNB-a and eNB-s for user plane and control plane respectively.
Figure 5B:
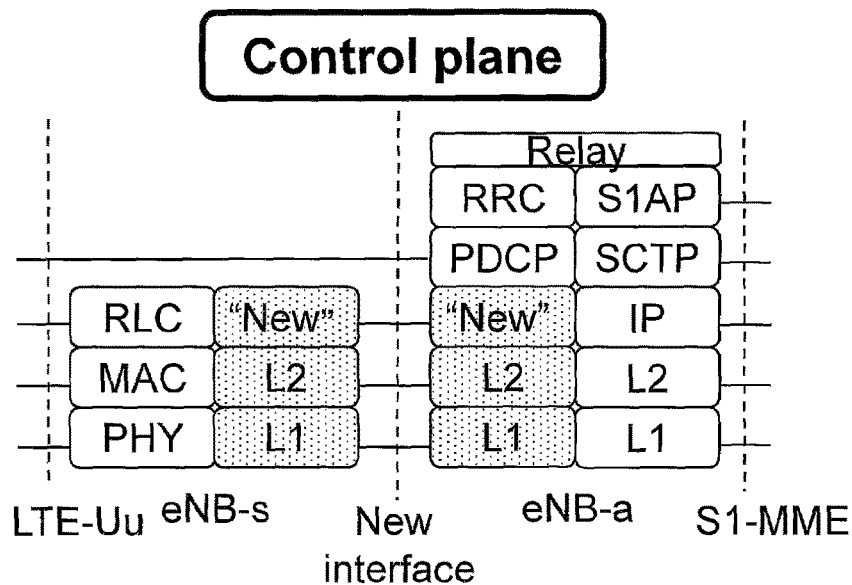
Figure 6A:
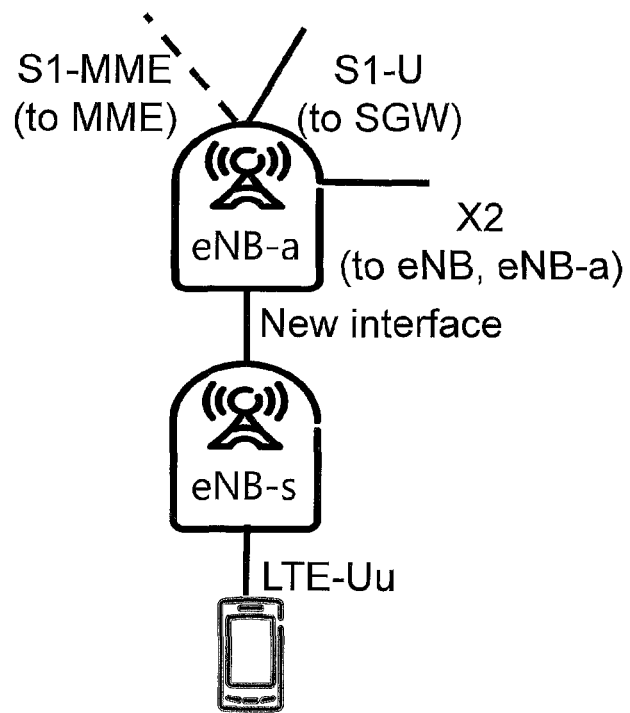
FIG. 6a schematically illustrates a network architecture with eNB-a and eNB-s.

Ongoing discussions in the wireless industry in different for a seem to move towards a direction where the functional architecture of the 5G radio access network should be designed flexible enough to be deployed in different hardware platforms and possibly in different sites in the network. A functional split as illustrated in FIG. 4 has been proposed. In this example, the Radio Access Network (RAN) functions are classified in synchronous functions (SF) and asynchronous functions (AF). Asynchronous functions are functions with loose timing constraints, and synchronous functions are typically executing time critical functionality. The synchronous network functions have requirements on processing timing which are strictly dependent on timing of a radio link used for communicating with the wireless device. The asynchronous network functions have requirements on processing timing not strictly dependent on the timing of the radio link, or even independent on the timing of the radio link. The synchronous functions may be placed in a logical node called eNB-s and the asynchronous functions may be placed in a logical node called eNB-a. The instances of functions associated to the eNB-s, i.e. the synchronous functions, are typically placed at a network element close to the air interface. The synchronous functions may form a group called a synchronous function group (SFG). The instances of the asynchronous functions associated to the eNB-a can be flexibly instantiated either at the network element close to the air interface, i.e. at the same network element as the synchronous functions or in other network elements such as fixed network nodes. If it is assumed that the functions are E-UTRAN functions, the split of functions may lead to the functional architecture for the control plane and the user plane illustrated in FIGS. 5a and 5b, where one new interface will be needed ("new" in FIGS. 5a and 5b). In FIGS. 5a and 5b, the eNB-a is illustrated for the user plane and the control plane respectively. The control plane and user plane parts of the eNB-a can be either combined or separated. FIG. 6a shows an exemplary network architecture view of the case where the parts are combined.

Figure 6B:
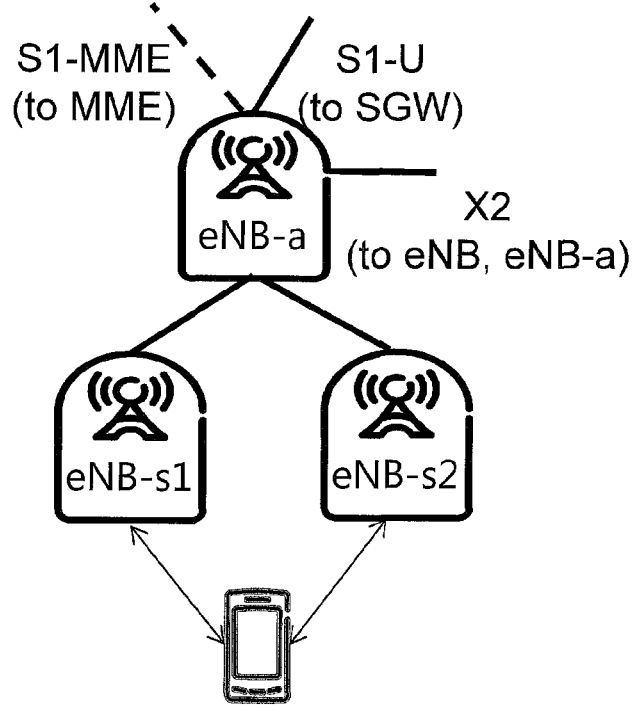
FIG. 6b schematically illustrates Dual Connectivity with eNB-a and e-NB-s established for a wireless device.

In order to support Dual Connectivity or multi-connectivity features, such as user plane aggregation for aggregated data rates, or control/user plane diversity for e.g. reliability and fast packet switching, instances of asynchronous functions can be made common to multiple instances of synchronous functions. In other words, a same instance associated to a function of an eNB-a can control multiple instances associated to an eNB-s function. This is illustrated in FIG. 6b where the eNB-a is a common point to which the UE is connected via two different eNB-s, i.e. via eNB-s1 and eNB-s2.

Figure 6C:
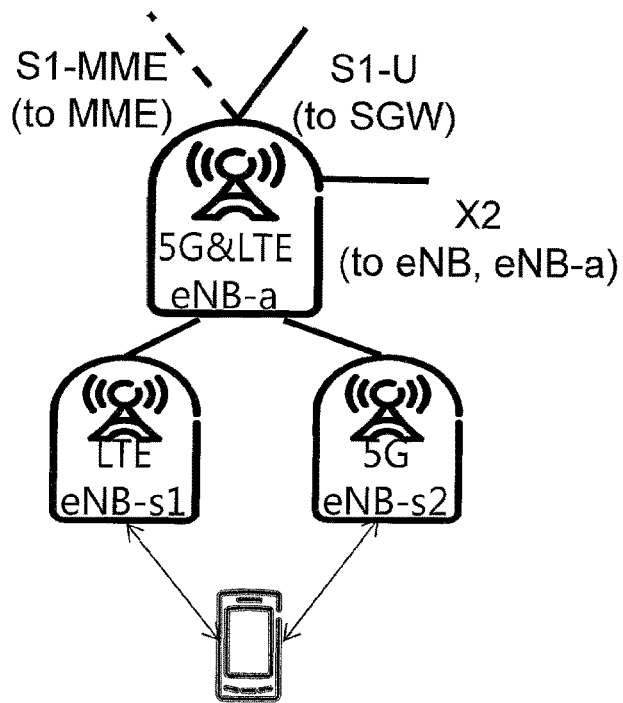
FIG. 6c schematically illustrates a Multi-RAT Dual Connectivity with eNB-a and e-NB-s established for a wireless device.

It is envisioned that 5G radio accesses will be composed by multiple air interfaces, e.g. air interface variants or air interfaces for different RATs. These multiple air interfaces may be tightly integrated, meaning that it is possible to have common function instances for multiple air interfaces. The previously described functional split between eNB-a and eNB-s can be extended so that the same instance of asynchronous functions are defined for multiple air interfaces, where the UE can be connected to the multiple air interfaces at the same time or during mobility procedures. The multiple air interfaces will then have different SFGs per air interface, e.g. for compatible-LTE and non-compatible LTE parts of the 5G radio access. The split illustrated in FIG. 6b may be applied for dual connectivity between different RATs, e.g. one LTE RAT and one 5G RAT. In this case the eNB-a can contain common support for both control and user plane for the asynchronous functions. An eNB-s for each RAT contains the synchronous functions, thus enabling that the synchronous functions are RAT-specific, e.g. different for LTE RAT and 5G RAT. Such a scenario is shown in FIG. 6c where the eNB-a is called "5G & LTE eNB-a" and the eNB-s are called "LTE eNB-s1" and "5G eNB-s2" respectively.

Figure 7:
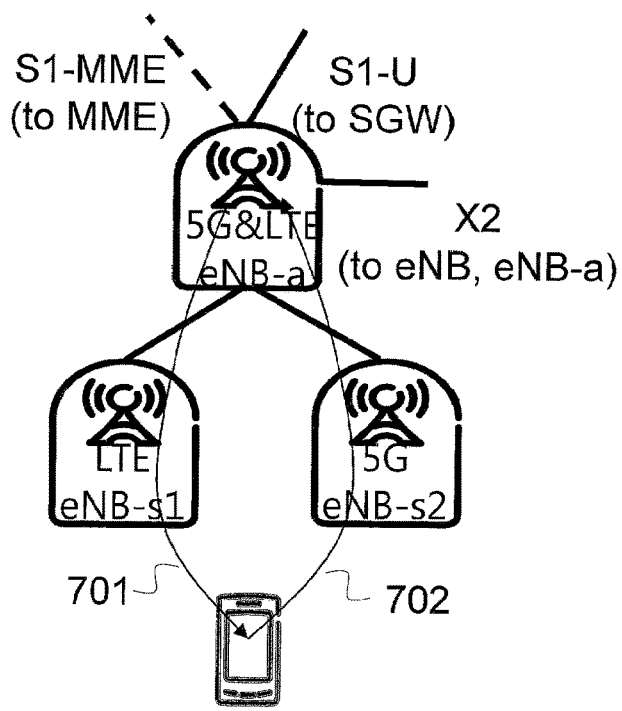
FIG. 7 schematically illustrates paging according to embodiments of the invention in an example scenario of Multi-RAT Dual Connectivity with eNB-a and e-NB-s established for a wireless device.

Embodiments of the invention are described in a non-limiting general context in relation to the example scenario illustrated in FIG. 7, where RAN functions are split between eNB-a and eNB-s1/e-NB-s2 based on whether they are asynchronous or synchronous. The same instance of asynchronous functions eNB-a is defined for two air interfaces in this scenario, the LTE-compatible and the non-LTE-compatible 5G accesses, but the two air interfaces have different synchronous function groups per air interface, illustrated by the two instances eNB-s1 and eNB-s2 in FIG. 7. However, eNB-s1 and eNB-s2 may in another scenario be from the same RAT. The embodiments described herein are mainly given in the context of multiple RATs, for example LTE and 5G RATs. However, the described embodiments may also apply for single RAT cases. Furthermore, even though embodiments of the invention are described in terms of LTE and 5G scenarios, they may apply to any network supporting multi-access paging. In some of the scenarios used as examples for describing embodiments of the invention, the network is divided into a core network part and a RAN part. However, embodiments of the invention is not limited to such a scenario as they may also be applied to other ways of distributing functionality in the network e.g. requiring no split into core network and RAN.

Although the functions in the example scenario in FIG. 7 are differentiated based on whether they are synchronous or not, it should be noted that embodiments of the invention may be applied to any other network function architecture where the network functions are split into two logical network nodes based on some other criteria than whether the function is synchronous or not, or where there is no functional split.

As described previously, it may be problematic that UEs initiate connections using non-optimal accesses such as legacy RATs, which is due to that the UEs preferably camp on a RAT that has good coverage to avoid frequent access reselections. The problem is that overhead and to some extent also user session establishment delay may increase if a handover immediately after connection establishment is needed. This problem is addressed by embodiments of the invention by enabling control of how a UE responds to a page when there are several accesses available for the UE to use for the transmission of the paging response. An access may be a frequency band, a RAT, and/or a cell. A given UE may thereby be paged in the access the UE is camping on, whereby the UE responds to the page using another access. The UE may e.g. be paged on an LTE-compatible RAT while responding on a non-LTE-compatible part of the 5G RAT.

Conventionally, a paging response typically needs be routed back to the originator of the page, i.e. a network node holding the UE context. However, in embodiments, the access used for camping and receiving page messages, and the access used for sending a paging response are not necessarily the same. In other words, the frequency band, cell, and/or RAT used for the paging response is independent of the frequency band, cell, and/or RAT on which the UE is camping.

Figure 9A:
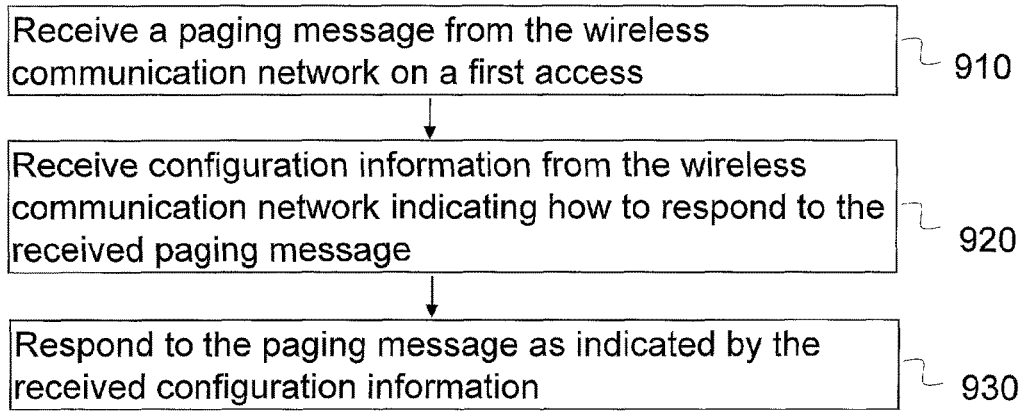
FIGS. 9a-b are flow charts schematically illustrating embodiments of a method for a wireless device according to various embodiments.

FIG. 9a is a flowchart illustrating one embodiment of a method for responding to a paging message. The method is performed by a wireless device 1150 in a wireless communication network. The method comprises:

910: Receiving a paging message from the wireless communication network on a first access.

920: Receiving configuration information from the wireless communication network indicating how to respond to the received paging message. The configuration information comprises information indicating that the received paging message should be responded to on another access than the first access. An access comprises at least one of a RAT, a cell, and a frequency band.

930: Responding to the paging message as indicated by the received configuration information.

How to respond to a received paging message is thus configured in the wireless device or UE by a network node, e.g. by an eNB. This implies that the UE can respond to a paging message as indicated by the configuration for how to respond. As one example, the UE can respond using a RAT indicated by the configuration, which may thus not be the same as the RAT on which the UE is camping.

In embodiments of the invention, the configuration information indicating how to respond to the received paging message may comprise information indicating at least one of the following:

- A procedure for transmitting the response to the paging message. One example may be that the information indicates that a random access procedure is to be used when responding. Furthermore, the information may indicate a preferred random access behavior for the wireless device to use, and which frequency or RAT to select for the random access.
- A transmission resource to use for the response to the paging message. One example is that the configuration information comprises information indicating which Physical Random Access Channel (PRACH) resources to use for the first random access message. This may indicate an exact transmission resource that the device must use or a set of possible transmission resources, e.g. a set of PRACH resources, for the UE to choose from. The indicated transmission resources may constitute a subset of transmission resources that are dedicated for random access transmissions, i.e. a subset of the regular random access transmission resources, e.g. a subset of PRACH resources that are configured through system information. The indicated transmission resources may also be other transmission resources than the regular random access transmission resources, i.e. transmission resources which may or may not be allocated as dedicated transmission resources for the wireless device.
- A random access preamble to use for the response to the paging message (e.g. a dedicated random access preamble).
- A radio link definition or a dedicated Access Information Table (AIT) to use for the response to the paging message. Examples are Physical Cell Identity (PCI) or Cell Radio Network Temporary Identifier (C-RNTI) allowing the wireless device to synchronize and attach to the radio link directly without going through normal System Control Plane (SCP)-random access procedure.
- An indication to use more aggressive contention resolution settings, or to use a higher initial transmission power or power increase parameters, or to use lower back-off timer settings for the random access preamble transmission than would otherwise have been the case.

When the wireless device responds to the paging message, it may therefore also take the above into account when responding.

In one embodiment, the configuration information is received in the paging message. However, in other embodiments, the configuration information may be received in a system information message, or in a configuration message dedicated for the wireless device. Furthermore, the configuration information may be received in several of the above described messages, e.g. divided into parts where one part is received in the paging message and the other part(s) received in system information messages.

As described above, the configuration information may be received in a system information item, e.g. in a separate parameter or in a separate message, transmitted in a given cell. In this alternative, due to the broadcast nature of the system information, the same way of responding to a paging is typically used by all UEs in the cell. Moreover, the UE may receive the indication for how to respond when it is in idle mode or in connected mode. Even if system information typically is transmitted using broadcast transmission, the same principle applies for multicast transmission of the system information message. Optionally, the configuration information in the system information may be structured such that different classes or types of UEs are given different indications for how to respond, e.g. based on a classmark or other UE type classification, such as Machine Type Communication (MTC) device, smartphone, or laptop. Alternatively, different classes or types of UEs are given different indications for how to respond based on subscription data associated with the UE. In case subscription data is used as the basis, it may, in certain embodiments, be beneficial if this subscription data information is propagated not only within the core network, but also further to the RAN, e.g. to the eNB-a.

Further, the configuration information may be received in a unicast signaling message transmitted to the UE prior to the paging message. In this alternative, the way for how to respond can be controlled for each UE individually. Moreover, the UE may receive this type of indication for how to respond typically only in connected mode.

In a further embodiment, the configuration information may be received as part of the paging message itself. In this alternative, the way for how to respond can be controlled for each UE individually, e.g. included in individual paging record(s) in the paging message, but also on per-message basis, i.e. applicable to all UEs being paged with the same paging message. Moreover, the UE may receive the indication for how to respond in a state when it receives the page, typically in idle mode but in some cases also in connected mode.

In embodiments, the configuration information may comprise an identifier of a network node that transmitted the paging message to the wireless device. The identifier may be included when responding to the paging message. This identifier may then be used by the network node receiving the paging response, as will be further described below with reference to FIG. 10.

In a further embodiment, the configuration information may comprise a first part indicating a set of alternative ways for how to respond to the received paging message, and a second part indicating which way in the set of alternative ways to use for responding to the paging message. The first part may be received in a system information message, and the second part may be received in the paging message, in accordance with the alternatives described previously related to what message to use for conveying the configuration information.

Figure 9B:
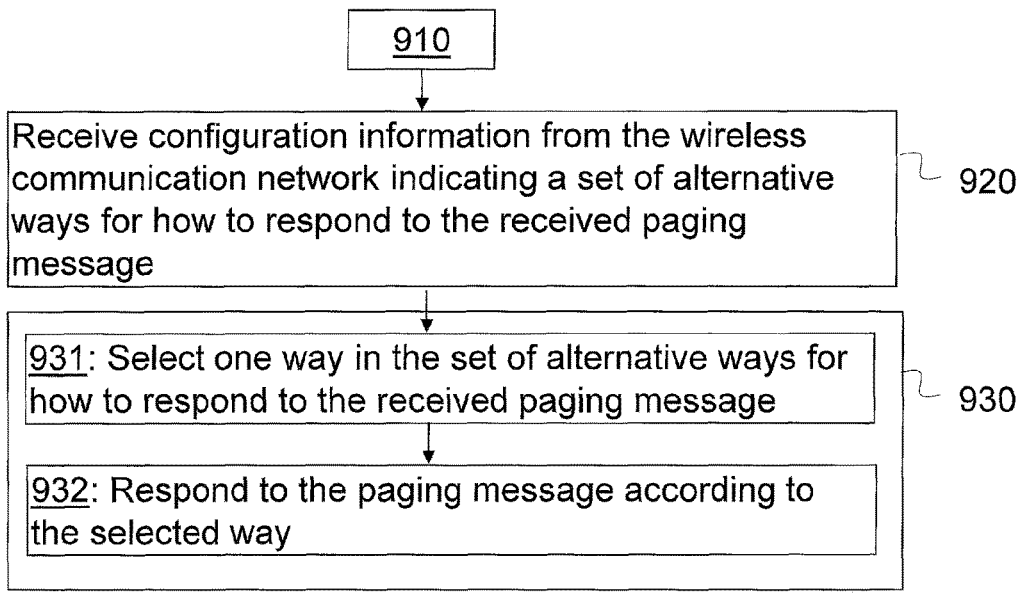

FIG. 9b is a flowchart illustrating another embodiment of the method in the wireless device. The method may comprise:

910: Receiving a paging message from the wireless communication network on a first access.

920: Receiving configuration information from the wireless communication network indicating how to respond to the received paging message. The configuration information may indicate a set of alternative ways for how to respond to the received paging message.

930: Therefore, responding to the paging message as indicated by the received configuration information may comprise selecting 931 one way in the set of alternative ways for how to respond to the received paging message, and responding 932 to the paging message according to the selected way.

In this embodiment, the wireless device has been configured with a set of alternative ways for how to respond to the received paging message. Each of these alternative ways are typically valid and allowed to use by the wireless device, and one of the alternative ways in the set needs to be selected. In embodiments, the selecting 931 may be random, or may be based on at least one of the following:

An order of priority of ways for how to respond. Examples are that one way for how to respond always takes precedence over all other ways for how to respond, or that a way for how to respond indicated in a unicast signaling message takes precedence over a way for how to respond indicated in a broadcast/multicast system information.

A measurement performed by the wireless device, e.g. a signal strength or channel quality measurement;

Subscription information related to the wireless device;

A preconfigured rule; and

Information related to the context of the wireless device, e.g. battery or energy status or current active applications.

In still another embodiment, which may be combined with any of the above described embodiments, the configuration information may comprise a rule for determining how to respond to the paging message. Responding 930 to the paging message may therefore comprise determining how to respond to the paging message based on the rule and at least one of the following:

A capability of the wireless device, such as data rate capacity, Multiple-Input-Multiple-Output (MIMO) capabilities, and RAT-support in general;

A property of the wireless device;

Information related to the context of the wireless device, such as knowledge about the nature of the type of downstream data that triggered the paging message;

Other examples of information that may be taken into account for determining how to respond may be a subscription type of the wireless device (which may require that this information is propagated from the core network to the RAN); knowledge about subscribed services (which may require that this information is propagated from the core network to the RAN); historical traffic statistics; and data cap and/or exceeded limits which e.g. may limit the device's possibility to benefit from a higher capacity of a RAT.

The above embodiments may also be combined. First, the network may provide in broadcast, multicast and/or unicast signaling message(s) a number of possible ways to respond, as described above with reference to FIG. 9b. In the paging message, the network includes pointer(s) to the preferred ways to respond to this particular paging message. A paging message transmitted from one base station may provide different pointers than another paging message, transmitted from another base station, even when the two paging messages belong to the same overall paging procedure, e.g. triggered by the same core network event.

In one embodiment which may be combined with any of the above described embodiments, the wireless device receives several paging messages e.g. from different antennas, RATs and/or network nodes. In this embodiment, there has to be a paging message selection in the wireless device. The configuration information indicating how to respond to a paging message may in this case comprise information defining how to respond in case of multiple paging messages. The wireless device may for example be configured to select one of the paging messages based on some criteria, and to respond on the same access as the selected paging message was received on. Which paging message to select in case of receiving multiple paging message may be based on a part of the configuration information, a random selection, a measurement on the received paging messages, device and/or node capability, and/or device battery status.

Figure 10:
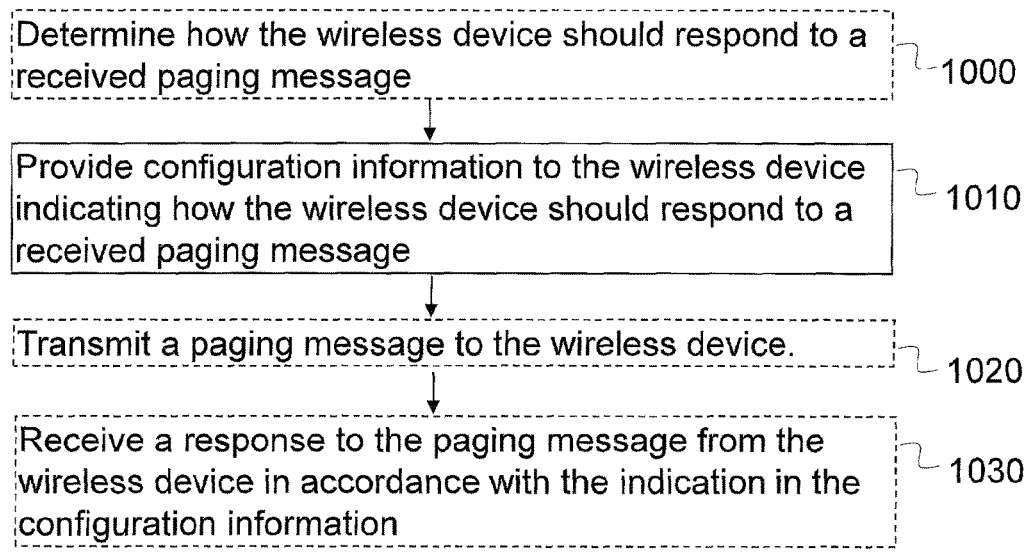
FIG. 10 is a flow chart schematically illustrating embodiments of a method for a network arrangement according to various embodiments.

FIG. 10 is a flowchart illustrating one embodiment of a method for supporting paging of a wireless device 1150. The method is performed by a network arrangement 1100 comprising one or more network nodes in a wireless communication network. The method comprises:

1000: (Optional) Determining how the wireless device 1150 should respond to a received paging message based on at least one of the following information related to the wireless device 1150: capability information; information related to a type of data that triggered the paging message; subscription type information; information regarding service subscriptions, traffic statistics, radio network specific information.

1010: Providing configuration information to the wireless device 1150 indicating how the wireless device 1150 should respond to a received paging message. The configuration information indicates that the received paging message should be responded to on another access than a first access on which the paging message is received. An access comprises at least one of a radio access technology, a cell, and a frequency band.

1020: (Optional) Transmitting a paging message to the wireless device 1150.

1030: (Optional) Receiving a response to the paging message from the wireless device 1150 in accordance with the indication in the configuration information. The response may be received by a first of the one or more network nodes of the network arrangement. The response may comprise an identifier of a second of the one or more network nodes network arrangement that transmitted the paging message to the wireless device 1150. The method may therefore further comprise the first of the one or more network nodes forwarding the response to the second of the one or more network nodes identified using the identifier.

Regarding the use of the identifier, there are a number of possible alternatives. The paging node, i.e. the second network node that transmits the paging message to the wireless device, may register a "paging hash" or another parameter that uniquely identifies the page, e.g. in the Mobility Management Entity (MME) of the core network. The paging node may then include the "paging hash" or the other parameter in the paging message. Alternatively, the device can autonomously derive the "paging hash" or the other parameter from the paging message. The wireless device may also derive the "paging hash" from information associated with the second node that the paging message is received from (such as a node identity) and/or information associated with the wireless device itself (such as a UE identity). The UE may include the "paging hash" in a message associated with the paging response procedure, e.g. message 3 (Msg 3) in the random access procedure. The network may thereby identify the paging node using the "paging hash" and either re-direct the wireless device, retrieve the device context, or forward the paging response to the paging node.

As already described above for the method performed by the wireless device, the configuration information indicating how to respond to the received paging message may comprise information indicating at least one of the following:

A procedure for transmitting the response to the paging message. One example may be that the information indicates that a random access procedure is to be used when responding. Furthermore, the information may indicate a preferred random access behavior for the wireless device to use, and which frequency or RAT to select for the random access.

A transmission resource to use for the response to the paging message. One example is that the configuration information comprises information indicating which Physical Random Access Channel (PRACH) resources to use for the first random access message. This may indicate an exact transmission resource that the device must use or a set of possible transmission resources, e.g. a set of PRACH resources, for the UE to choose from. The indicated transmission resources may constitute a subset of transmission resources that are dedicated for random access transmissions, i.e. a subset of the regular random access transmission resources, e.g. a subset of PRACH resources that are configured through system information. The indicated transmission resources may also be other transmission resources than the regular random access transmission resources, i.e. transmission resources which may or may not be allocated as dedicated transmission resources for the wireless device.

A random access preamble to use for the response to the paging message (e.g. a dedicated random access preamble).

A radio link definition or a dedicated Access Information Table (AIT) to use for the response to the paging message. Examples are Physical Cell Identity (PCI) or Cell Radio Network Temporary Identifier (C-RNTI) allowing the wireless device to synchronize and attach to the radio link directly without going through normal System Control Plane (SCP)-random access procedure.

An indication to use more aggressive contention resolution settings, or to use a higher initial transmission power or power increase parameters, or to use lower back-off timer settings for the random access preamble transmission than would otherwise have been the case.

Furthermore, the configuration information may be received in at least one of the paging message, in a system information message, or in a configuration message dedicated for the wireless device.

Interaction Between the Core Network and the RAN

In embodiments, the network functionality may be divided into a core network and a RAN part. In such a case, the core network and/or the RAN may be in control of the determining of how the wireless device 1150 should respond to a received paging message. This means that the method performed in the network arrangement described above with reference to FIG. 10 may be performed in one or more network nodes of the core network or of the RAN, or in network nodes of both the core network and the RAN. Regardless of where the control is, an interaction between the core network and the RAN may be used for acquiring relevant input data to make the determination in step 1000. When the ways for how to respond is to vary for different devices and even on a case by case basis, the determining in 1000 may among other things be based on wireless device or subscription specific properties. This implies that the determining should be controlled by the core network, since the RAN (at least in the typical case where the wireless device is in idle mode in the RAN) is not aware of the UE and its properties until it is connected. The core network may instruct the wireless device by including an indication of how to respond to a received paging in the paging instruction to the RAN. The paging instruction with the indication of how to respond to a received paging may be opaque to the RAN which then simply forwards it to the device when paging the device. Another alternative is that the core network sends explicit information to the RAN which is to be interpreted by the RAN when it requests the RAN to page the wireless device. As an example with EPS/LTE terminology, the MME may indicate a determined indication for how to respond to a paging in the S1AP Paging message to the eNB.

However, also non-UE specific circumstances, which are more RAN specific, may be taken into account when determining how the wireless devices should respond to a paging message. One example of such circumstances is the current load in the concerned accesses (cells, frequencies, or RATs). Hence, a suitable principle may be that the core network indicates that the wireless device is multi-RAT capable and possibly that it is able to benefit from the increased performance of e.g. a 5G RAT. However, it is the RAN (e.g. the eNB) that makes the final determination of how to respond to a paging message, and whether to take the multi-RAT capability into account or not. Alternatively, the core network is given some more say in the matter by providing a recommended way of responding to a paging message or a "rating" in the Paging S1AP message, indicating how beneficial the use of the 5G RAT would be for the device. The RAN may then use this extra information in a trade-off decision when finally determining how the device shall respond to a paging.

Embodiments of Apparatus Described with Reference to FIGS. 11*a-c*

Wireless Device

Figure 11A:
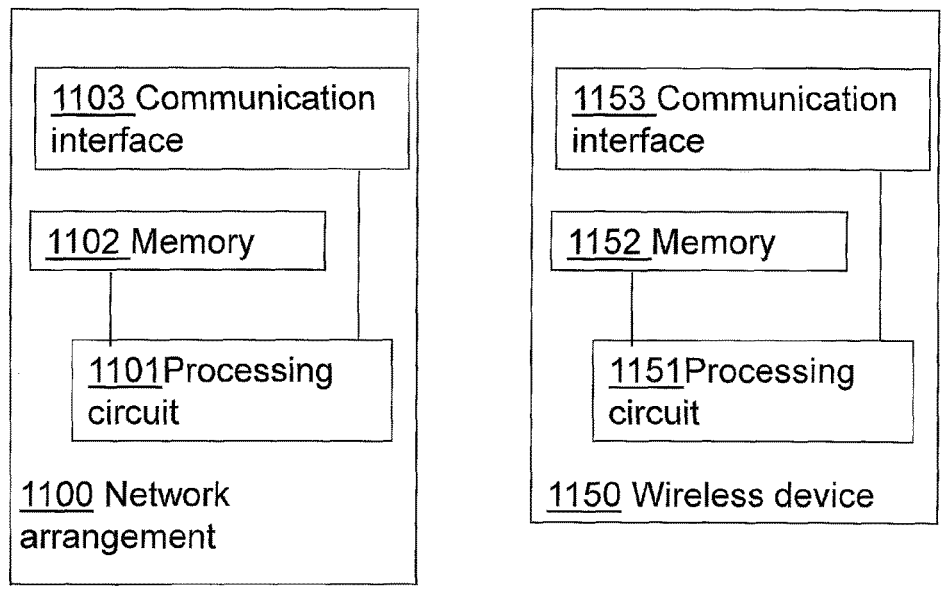
FIGS. 11a-c are block diagrams schematically illustrating embodiments of a wireless device and a network arrangement according to various embodiments.

An embodiment of a wireless device 1150 for a wireless communication network is schematically illustrated in the block diagram in FIG. 11*a*. The wireless device is configured to respond to a paging message. The wireless device is further configured to receive a paging message from the wireless communication network on a first access, and receive configuration information from the wireless communication network indicating how to respond to the received paging message. The configuration information comprises information indicating that the received paging message should be responded to on another access than the first access. An access comprises at least one of a radio access technology, a cell, and a frequency band. The wireless device is also configured to respond to the paging message as indicated by the received configuration information.

In embodiments, the wireless device 1150 may be configured to receive the configuration information comprising information indicating at least one of the following: a procedure for transmitting the response to the paging message; a transmission resource to use for the response to the paging message; a random access preamble to use for the response to the paging message; a radio link definition to use for the response to the paging message. Furthermore, the wireless device 1150 may be configured to receive the configuration information in at least one of the following: the paging message, a system information message, and a configuration message dedicated for the wireless device 1150.

In further embodiments, the wireless device 1150 may be configured to receive the configuration information comprising an identifier of a network node that transmitted the paging message to the wireless device 1150, and to include the identifier when responding to the paging message. Furthermore, the wireless device 1150 may be configured to receive configuration information comprising a first part indicating a set of alternative ways for how to respond to the received paging message, and a second part indicating which way in the set of alternative ways to use for responding to the paging message. The first part may be received in a system information message, and the second part may be received in the paging message.

In other embodiments, the wireless device 1150 may be configured to receive configuration information indicating a set of alternative ways for how to respond to the received paging message, and to respond to the paging message by selecting one way in the set of alternative ways for how to respond to the received paging message, and responding to the paging message according to the selected way. The wireless device 1150 may be further configured to select one way in the set of alternative ways randomly, or based on at least one of the following: an order of priority of ways for how to respond; a measurement performed by the wireless device 1150; subscription information related to the wireless device 1150; a preconfigured rule; and information related to the context of the wireless device 1150.

The wireless device 1150 may be further configured to receive the configuration information comprising a rule for determining how to respond to the paging message. The wireless device 1150 may also be configured to respond to the paging message by determining how to respond to the paging message based on the rule and at least one of the following: a capability of the wireless device 1150; a property of the wireless device 1150; and information related to the context of the wireless device 1150. The wireless device 1150 may be configured to respond to the paging message by responding to the paging message as determined.

As illustrated in FIG. 11a, the wireless device 1150 may comprise a processing circuit 1151 and a memory 1152 in embodiments of the invention. The wireless device 1150 may also comprise a communication interface 1153 configured to communicate with the wireless communication network. The wireless device 1150 may in embodiments comprise a transceiver adapted to communicate wirelessly with network nodes of the wireless communication network. The memory 1152 may contain instructions executable by said processing circuit 1151, whereby the wireless device 1150 may be operative to receive a paging message from the wireless communication network on a first access. The wireless device 1150 may also be operative to receive configuration information from the wireless communication network indicating how to respond to the received paging message. The configuration information comprises information indicating that the received paging message should be responded to on another access than the first access. An access comprises at least one of a radio access technology, a cell, and a frequency band. The wireless device 1150 may be further operative to respond to the paging message as indicated by the received configuration information.

Figure 11B:
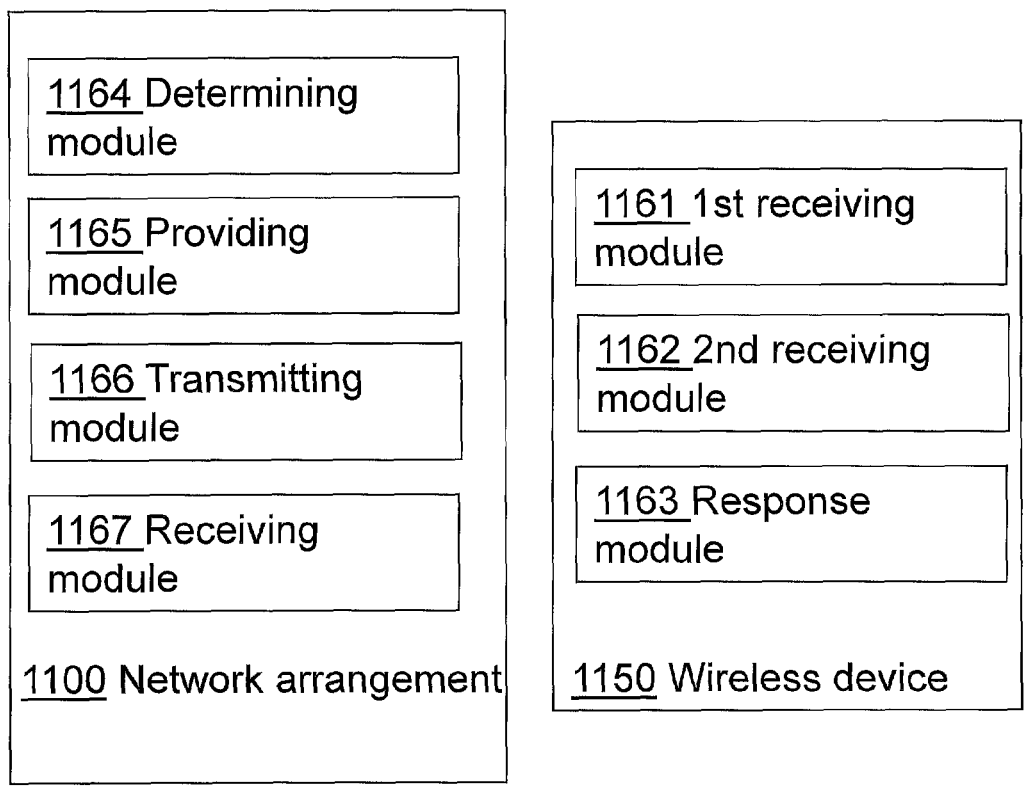
Figure 11C:
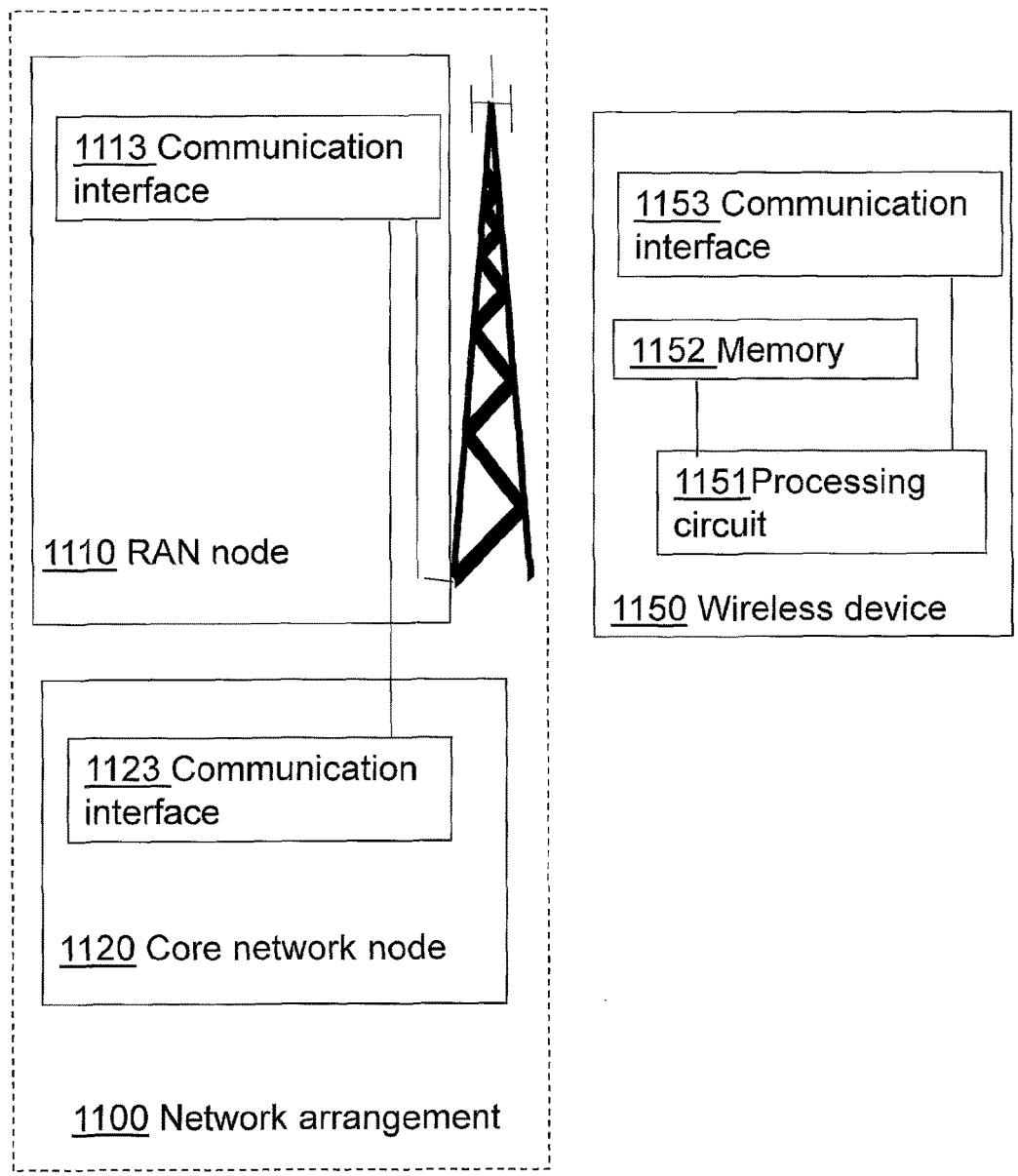

In an alternative way to describe the embodiment in FIG. 11a illustrated in FIG. 11b, the wireless device 1150 may comprise a first receiving module 1161 adapted to receive a paging message from the wireless communication network on a first access. The wireless device 1150 may also comprise a second receiving module 1162 adapted to receive configuration information from the wireless communication network indicating how to respond to the received paging message. The configuration information comprises information indicating that the received paging message should be responded to on another access than the first access. An access comprises at least one of a radio access technology, a cell, and a frequency band. The wireless device 1150 may also comprise a response module 1163 adapted to respond to the paging message as indicated by the received configuration information.

The modules described above are functional units which may be implemented in hardware, software, firmware or any combination thereof. In one embodiment, the modules are implemented as a computer program running on a processor.

In still another alternative way to describe the embodiment in FIG. 11a, the wireless device 1150 may comprise a Central Processing Unit (CPU) which may be a single unit or a plurality of units. Furthermore, the wireless device 1150 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the wireless device 1150 causes the wireless device 1150 to perform the methods described earlier in conjunction with FIGS. 9a-b. In other words, when said code means are run on the CPU, they correspond to the processing circuit 1151 of the wireless device 1150 in FIG. 11a.

Network Arrangement

Embodiments of the network arrangement 1100 are schematically illustrated in the block diagram in FIG. 11a. The network arrangement 1100 may comprise only one network node. This network node may e.g. be an eNodeB in an LTE network. Alternatively, the network arrangement 1100 may comprise multiple network nodes. In one embodiment illustrated in FIG. 11c, the network arrangement 1100 may comprise a first network node which may be a RAN node 1110 such as the eNodeB in LTE, and a second network node which may be a core network node 1120 such as an MME in LTE. The first and second network nodes, 1110, 1120, may interact via communication interfaces 1113 and 1123, e.g. in order to determine how the wireless device 1150 should respond to a paging message as described above. However, these are just non-limiting examples of the network arrangement 1100. In the example scenarios for the split architecture described hereinafter, further examples of the network nodes involved are described.

The network arrangement 1100 for a wireless communication network illustrated in FIG. 11a is configured to support paging of a wireless device 1150. The network arrangement 1100 comprises one or more network nodes and is further configured to provide configuration information to the wireless device 1150 indicating how the wireless device 1150 should respond to a received paging message. The configuration information indicates that the received paging message should be responded to on another access than a first access on which the paging message is received. An access comprises at least one of a radio access technology, a cell, and a frequency band.

The network arrangement 1100 may comprise a RAN node configured to provide configuration information to the wireless device 1150 by transmitting the configuration information to the wireless device 1150. The RAN node may e.g. be an eNodeB in LTE. The network arrangement 1100 may comprise a core network node configured to provide configuration information to the wireless device 1150 by sending the configuration information to the wireless device transparently via an eNodeB.

In embodiments, the network arrangement 1100 may be further configured to determine how the wireless device 1150 should respond to a received paging message based on at least one of the following information related to the wireless device 1150: capability information; information related to a type of data that triggered the paging message; subscription type information; information regarding service subscriptions, traffic statistics, radio network specific information.

In embodiments, the network arrangement 1100 may be further configured to transmit a paging message to the wireless device 1150. The network arrangement 1100 may also be configured to receive a response to the paging message from the wireless device 1150 in accordance with the indication in the configuration information. A first of the one or more network nodes of the network arrangement 1100 may be configured to receive the response comprising an identifier of a second of the one or more network nodes of the network arrangement that transmitted the paging message to the wireless device 1150. The first of the one or more network nodes may be configured to forward the response to the second of the one or more network nodes identified using the identifier.

In embodiments, the network arrangement 1100 may be further configured to provide the configuration information comprising information indicating at least one of the following: a procedure for transmitting the response to the paging message; a transmission resource to use for the response to the paging message; a random access preamble to use for the response to the paging message; a radio link definition to use for the response to the paging message.

The network arrangement 1100 may be further configured to provide the configuration information in at least one of the following: the paging message, a system information message, and a configuration message dedicated for the wireless device 1150.

As illustrated in FIG. 11*a*, the network arrangement 1100 may comprise a processing circuit 1101 and a memory 1102 in embodiments of the invention. The network arrangement 1100 may also comprise a communication interface 1103 configured to communicate with the wireless device 1150, either directly or via some other network node. The memory 1102 may contain instructions executable by said processing circuit 1101, whereby the network arrangement 1100 may be operative to provide configuration information to the wireless device 1150 indicating how the wireless device should respond to a received paging message. The configuration information comprises information indicating that the received paging message should be responded to on another access than the first access. An access comprises at least one of a radio access technology, a cell, and a frequency band. The network arrangement 1100 may in embodiments be further operative to determine how the wireless device 1150 should respond to a received paging message based on information related to the wireless device.

In an alternative way to describe the embodiment in FIG. 11*a* illustrated in FIG. 11*b*, the network arrangement 1100 may comprise a providing module 1165 adapted to provide configuration information to the wireless device 1150 indicating how the wireless device should respond to a received paging message. The configuration information comprises information indicating that the received paging message should be responded to on another access than the first access. An access comprises at least one of a radio access technology, a cell, and a frequency band. The network arrangement 1100 may also comprise a determining module 1164 adapted to determine how the wireless device 1150 should respond to a received paging message based on at least one of the following information related to the wireless device 1150: capability information; information related to a type of data that triggered the paging message; subscription type information; information regarding service subscriptions, traffic statistics, radio network specific information. The network arrangement 1100 may also comprise a transmitting module 1166 adapted to transmit a paging message to the wireless device 1150, and a receiving module 1167 adapted to receive a response to the paging message from the wireless device 1150 in accordance with the indication in the configuration information.

The modules described above are functional units which may be implemented in hardware, software, firmware or any combination thereof. In one embodiment, the modules are implemented as a computer program running on a processor.

In still another alternative way to describe the embodiment in FIG. 11*a*, the network arrangement 1100 may comprise a Central Processing Unit (CPU) which may be a single unit or a plurality of units. Furthermore, the network arrangement 1100 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU(s) of the network arrangement 1100 causes the network arrangement 1100 to perform the methods described earlier in conjunction with FIG. 10. In other words, when said code means are run on the CPU, they correspond to the processing circuit 1101 of the network arrangement 1100 in FIG. 11*a*.

Figure 8A:
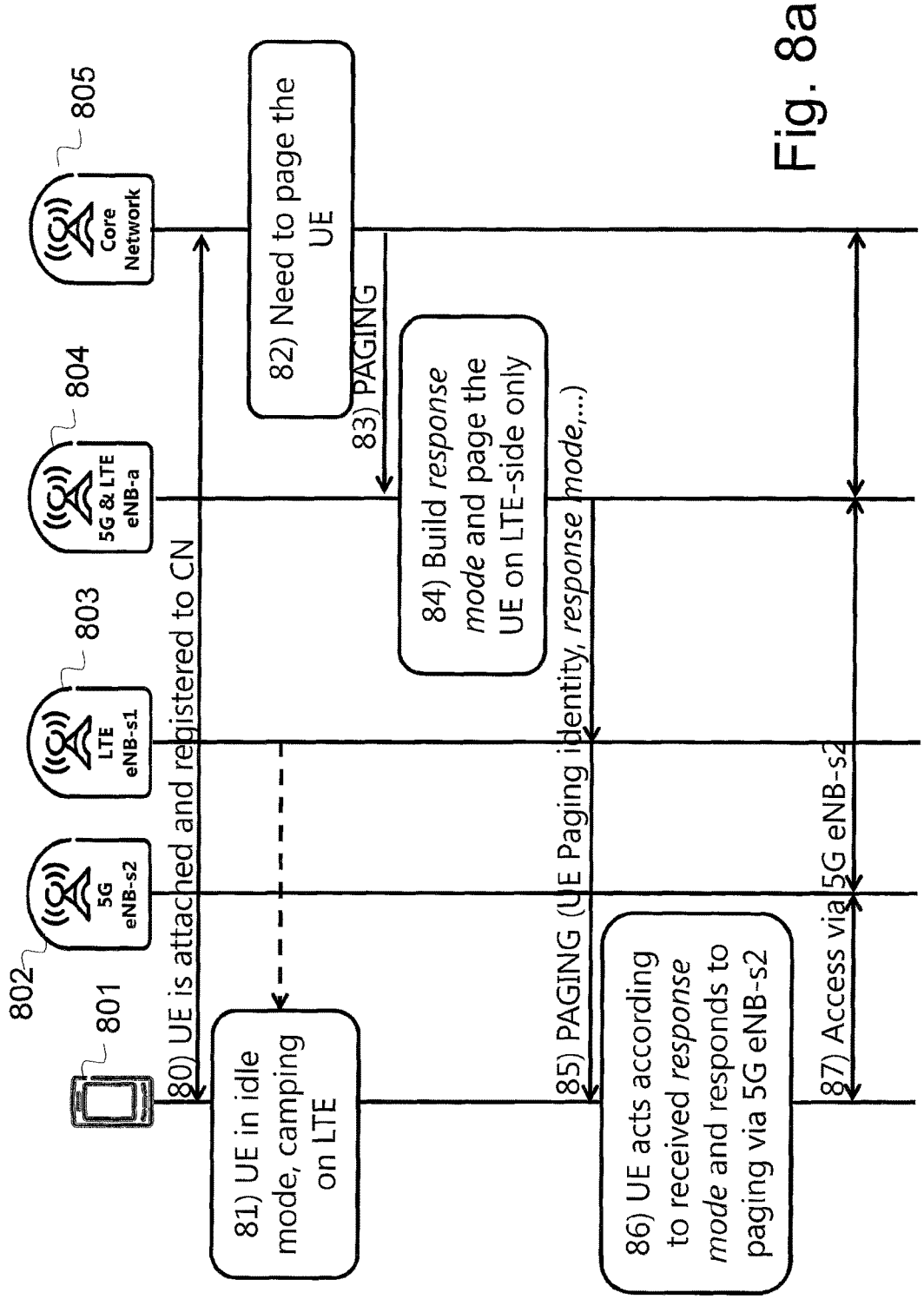
FIGS. 8a-b are signaling diagrams schematically illustrating signaling according to embodiments of the invention.
Figure 8B:
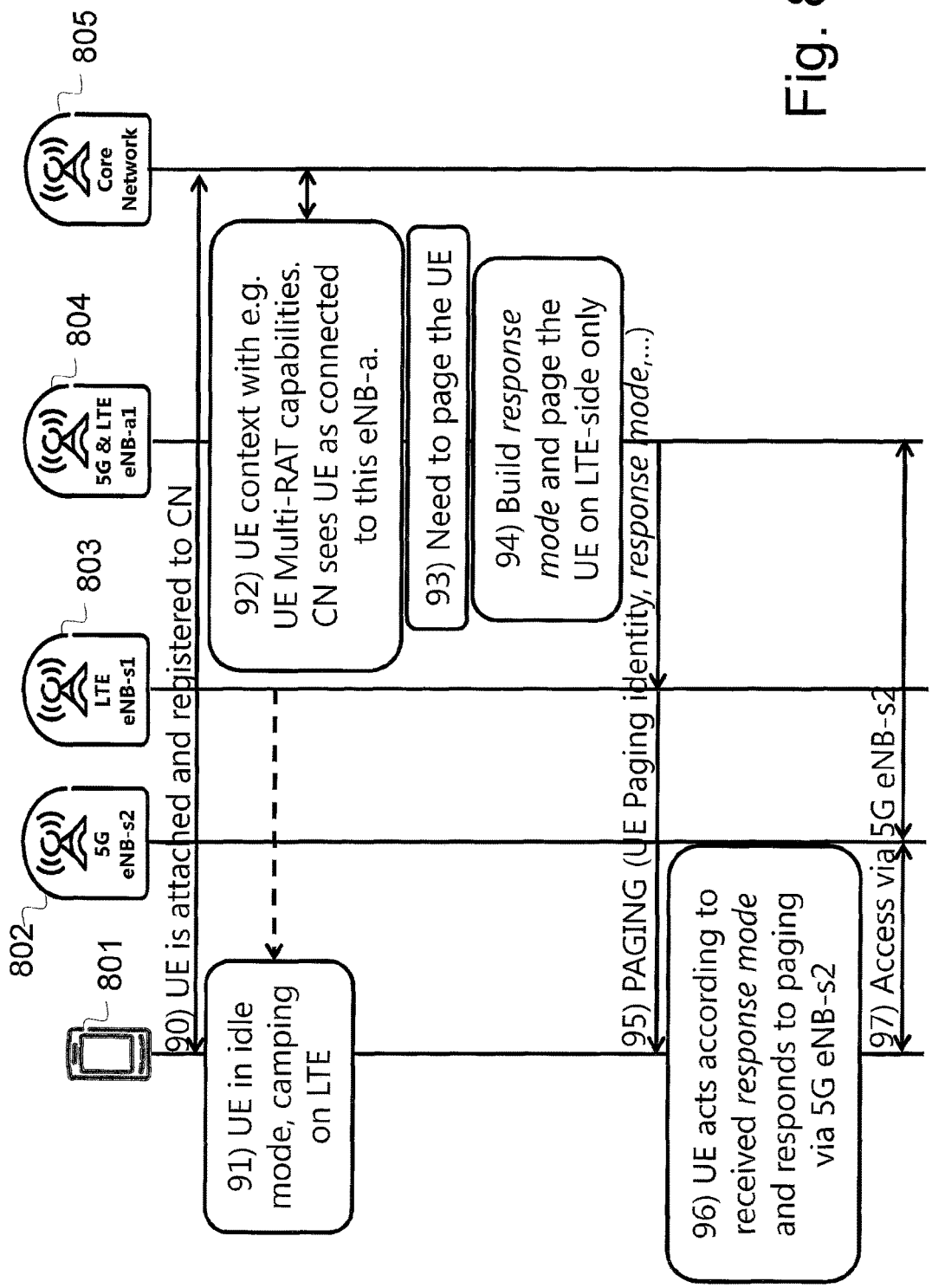

Split Architecture Scenario for Tight Multi-RAT Integration (FIGS. 8*a*-*b*)

In the following, the high-level signaling diagrams in FIGS. 8*a*-*b* are described, illustrating an example embodiment of the invention when applied in the tight Multi-RAT integration solution based on a base station split as described above with reference to FIG. 7. In the example scenario illustrated in FIG. 7, the UE is initially camping on LTE and receives a Paging Request in 701 from LTE eNB-s1, i.e. the LTE-compatible part of 5G. The UE sends the Paging Response in 702 via 5G eNB-s2, i.e. the non-LTE-compatible part of 5G. In the scenario of FIG. 8*a*, the UE 801 is in idle mode in the RAN and it is the network that controls the configuration information indicating how to respond to the received paging message, and includes it in the paging message sent to the UE 801 from LTE eNB-s1 803 in 85. In this example the configuration information indicates that a paging message received in the LTE RAT should be responded to in the 5G RAT. The UE 801 acts according to the received configuration information in 86 and sends the paging response to 5G eNB-s2 802 in 87.

The signaling diagram in FIG. 8*a* is a high-level example of how embodiments of the invention can be applied in the base station split architecture for tight multi-RAT integration. Different details known to the one skilled in the art related to idle mode camping and paging are omitted. Even though not described in detail, other embodiments described above apply also for this architecture.

80: Initially the UE 801 is attached and registered on a registration area, such as a location area, a routing area or a tracking area, to the core network 805.

81: The UE 801 is in idle mode in the RAN (such as RRC_IDLE) and is camping in the LTE RAT. LTE eNB-s1 803 is controlling at least one cell belonging to the current registration area for the UE 801 and the UE 801 is camping on such a cell.

82: A need to page the UE is detected in the core network 805. This need may arise for example due to downlink data received for the UE 801. The different nodes and functions in the core network 805 are not further described.

83: The core network 805 sends a paging message to the RAN. This message may be sent towards multiple RAN nodes or to a single RAN node. In either case it is sent to RAN node(s) that are controlling at least one cell belonging to the current registration area of the UE. The message contains a Paging Identity for the UE and some indication of the current registration area for the UE 801. The message may also contain an indication about UE's multi-RAT capabilities, for example that the UE 801 is capable of both LTE-compatible part and the non-LTE-compatible part of 5G, and/or possibly other information that may assist the RAN when determining how to respond to a paging message. In addition, the paging message may contain a determined way for how to respond to a paging message or at least a recommendation for how to respond to a paging message. Including a way for how to respond in the paging message implies a scenario where the core network 805 is in control of the way for way for how to respond. This is one possible embodiment, but variants where the RAN is in control are also possible as discussed above.

84: In the example in FIG. 8a the paging message is received by the 5G & LTE eNB-a 804. 5G & LTE eNB-a 804 uses the received information to build configuration information indicating how the UE 801 should respond to a received paging message. In the example, the configuration information comprises information about 5G eNB-s2 802, i.e. information that the paging should be replied to via 5G eNB-s2 802, or simply information indicating 5G, i.e. information that the paging should be replied to via the 5G RAT. 5G & LTE eNB-a 804 creates a paging message to be transmitted over the radio interface and includes the configuration information indicating how the UE should respond to a received paging message. The configuration information may also comprise other information indicating how to respond.

85: 5G & LTE eNB-a 804 sends the paging message via the LTE eNB-s1 803.

86: The UE receives the paging message from LTE eNB-s1 803 with the configuration information indicating how the UE should respond, and the UE acts according to this indication. Therefore the UE knows that it should respond to the received paging via 5G eNB-s2 802, or, less specifically, via the 5G RAT.

87: The UE responds to the paging by accessing 5G-eNB-s2. This may consist of random access and RRC connection establishment. The latter may be performed towards 5G & LTE eNB-a 804. In addition, the core network 805 is informed about the UE entering connected mode.

Still another example is shown in FIG. 8b. In this case the UE is in idle state in the different eNB-s, i.e. in LTE eNB-s1 803 803 and 5G eNB-s2 802 which consequently have no context for and are not aware of the UE. The 5G & LTE eNB-a 804 however has a UE-context for the UE and the UE is seen by the core network 805 as being connected to 5G & LTE eNB-a 804.

90: Same as in step 80 in FIG. 8a.

91: Same as in step 81 in FIG. 8a with the exception that the UE is idle only on eNB-s level.

92: 5G & LTE eNB-a 804 holds a UE-context for the UE. This UE context may contain different information, such as UE Multi-RAT capabilities. In addition, the core network 805 sees the UE as connected to 5G & LTE eNB-a 804, i.e. there exist both a signaling connection and user plane connections for the UE between the core network 805 and the 5G & LTE eNB-a 804.

93: A need to page the UE is detected in 5G and LTE eNB-a1. This need may arise for example due to downlink data received for the UE from the core network 805.

94: 5G & LTE eNB-a 804 builds configuration information indicating how the UE should respond to a received paging message. In the current example, the configuration information comprises information about 5G eNB-s2 802, i.e. information that the paging should be replied to via 5G eNB-s2 802, or simply information indicating 5G, i.e. information that the paging should be replied to via the 5G RAT. 5G & LTE eNB-a 804 creates a paging message to be sent over the radio interface and includes the configuration information indicating how the UE should respond to a received paging message. The configuration information may also comprise other information indicating how to respond.

95: 5G & LTE eNB-a 804 sends the paging message via the LTE eNB-s1 803.

96: The UE receives the paging message from LTE eNB-s1 803 with the configuration information and the UE acts according to this configuration information. Therefore the UE knows that it should respond to the received paging via 5G eNB-s2 802 or, less specifically, via the 5G RAT.

97: The UE responds to the paging by accessing 5G-eNB-s2. This may consist of random access and RRC connection establishment. The latter may be performed towards 5G & LTE eNB-a 804.

The above mentioned and described embodiments are only given as examples and should not be limiting. Other solutions, uses, objectives, and functions within the scope of the accompanying patent claims may be possible.

The invention claimed is:

1. A method for responding to a paging message, the method being performed by a wireless device operating in a wireless communication network and method comprising:
  receiving a paging message transmitted by the wireless communication network in a first frequency band;
  evaluating a received signal strength or quality for the first frequency band at the wireless device, according to configuration information received by the wireless device, the configuration information transmitted by the wireless communication network separately from the paging message; and
  depending on the evaluation, responding to the paging message in the first frequency band or in a second frequency band that is linked by the wireless communication network with the first frequency band, for providing the wireless device with at least one of aggregated data rates or diversity for control- and/or user-plane connections between the wireless device and the wireless communication network.

2. The method of claim 1, wherein the method includes receiving the configuration information via System Information (SI) broadcasted by a network node of the wireless communication network.

3. The method of claim 1, wherein the method includes receiving the configuration information via a unicast transmission transmitted by a network node of the wireless communication network and targeting the wireless communication device.

4. The method of claim 1, further comprising receiving the configuration information in advance of receiving the paging message.

5. The method of claim 1, wherein the configuration information comprising information for evaluating the received signal strength for the first frequency band at the wireless device.

6. The method of claim 5, further comprising determining the received signal strength by performing one or more measurements on the paging message or another signal transmitted by the wireless communication network in the first frequency band and received by the wireless device.

7. The method of claim 6, wherein the configuration information further comprises priority information associated with one or both the first and second frequency bands to be evaluated by the wireless device in conjunction with the received signal strength.

8. A wireless device configured for operation in a wireless communication network and comprising:
 communication circuitry configured to communicate with a wireless communication network in first and second frequency bands; and
 processing circuitry configured to:
  receive, via the communication circuitry, a paging message transmitted by the wireless communication network in the first frequency band;
  evaluate a received signal strength or quality for the first frequency band at the wireless device, according to configuration information received by the wireless device, the configuration information transmitted by the wireless communication network separately from the paging message; and
  depending on the evaluation, responding to the paging message in the first frequency band or in a second frequency band that is linked by the wireless communication network with the first frequency band, for providing the wireless device with at least one of aggregated data rates or diversity for control- and/or user-plane connections between the wireless device and the wireless communication network.

9. The wireless device of claim 8, wherein the processing circuitry is configured to receive the configuration information via System Information (SI) broadcasted by a network node of the wireless communication network.

10. The wireless device of claim 8, wherein the processing circuitry is configured to receive the configuration information via a unicast transmission transmitted by a network node of the wireless communication network and targeting the wireless communication device.

11. The wireless device of claim 8, wherein the processing circuitry is configured to receive the configuration information in advance of receiving the paging message, such that the configuration information is available for use by the processing circuitry upon receipt of the paging message.

12. The wireless device of claim 8, wherein the configuration information comprises information for evaluating the received signal strength for the first frequency band at the wireless device.

13. The wireless device of claim 8, wherein the processing circuitry or the communication circuitry is configured to determine the received signal strength by performing one or more measurements on the paging message or another signal transmitted by the wireless communication network in the first frequency band and received by the wireless device.

14. The wireless device of claim 13, wherein the configuration information further comprises priority information associated with one or both the first and second frequency bands, to be evaluated by the wireless device in conjunction with the received signal strength.

15. A method of operation by a network node operating in a wireless communication network, the method comprising:
 associating a first frequency band with a second frequency band, for supporting a wireless device, such that the first and second frequency bands are, with respect to the wireless device, linked by the wireless communication network for providing the wireless device with at least one of aggregated data rates or diversity for control- and/or user-plane connections between the wireless device and the wireless communication network;
 determining configuration information that configures the wireless device to choose between the first and second frequency bands when responding to paging messages targeted to the wireless device and sent in the first frequency band, as a function of the wireless device evaluating signal strength or signal quality for the first frequency band;
 transmitting the configuration information for reception by the wireless device; and
 transmitting a paging message in the first frequency band, the paging message targeting the wireless device and transmitted separately from the configuration information.

16. The method of claim 15, wherein determining the configuration information further indicates priority information for choosing between the first and second frequency bands.

17. The method of claim 15, wherein transmitting the configuration information comprises transmitting the configuration information in System Information (SI) that is broadcasted by the network node.

18. The method of claim 15, wherein transmitting the configuration information comprises transmitting the configuration information in a unicast transmission targeted to the wireless device.

19. A network node configured for operation in a wireless communication network, the network node comprising:
 communication circuitry configured for operation in a first frequency band and in a second frequency band; and
 processing circuitry configured to:
  associate the first frequency band with the second frequency band, for supporting a wireless device, such that the first and second frequency bands are, with respect to the wireless device, linked by the wireless communication network for providing the wireless device with at least one of aggregated data rates or diversity for control- and/or user-plane connections between the wireless device and the wireless communication network;
  determine configuration information that configures the wireless device to choose between the first and second frequency bands when responding to paging messages targeted to the wireless device and sent in the first frequency band, as a function of the wireless device evaluating signal strength or signal quality for the first frequency band;

transmit, via the communication circuitry, the configuration information for reception by the wireless device; and transmit, via the communication circuitry, a paging message in the first frequency band, the paging message targeting the wireless device and transmitted separately from the configuration information.

20. The network node of claim 19, wherein the processing circuitry is configured to determine the configuration information such that the configuration information further indicates priority information for choosing between the first and second frequency bands.

21. The network node of claim 19, wherein the processing circuitry is configured to transmit the configuration information in System Information (SI) that is broadcasted by the network node.

22. The network node of claim 19, wherein the processing circuitry is configured to transmit the configuration information in a unicast transmission targeted to the wireless device.

* * * * *